United States Patent
Yao (10) Patent No.: US 7,663,829 B2
(45) Date of Patent: Feb. 16, 2010

(54) PERFORMANCE TEST METHOD OF HEAD GIMBAL ASSEMBLY WITH PRECISE POSITIONING MICRO-ACTUATOR

(75) Inventor: MingGao Yao, Dongguan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 360 days.

(21) Appl. No.: 11/878,871

(22) Filed: Jul. 27, 2007

(65) Prior Publication Data

US 2009/0027808 A1    Jan. 29, 2009

(51) Int. Cl.
*G11B 27/36* (2006.01)

(52) U.S. Cl. .................. 360/31; 360/75; 360/78.05; 360/294.4

(58) Field of Classification Search .................. None
See application file for complete search history.

(56) References Cited

U.S. PATENT DOCUMENTS 6,801,377 B2 * 10/2004 Kasajima et al. .............. 360/31
7,085,083 B2 *  8/2006 Zhu et al. ..................... 360/31
2002/0135913 A1 *  9/2002 Yanagimoto ................. 360/31
2003/0048561 A1 *  3/2003 Kadokawa ................... 360/48

\* cited by examiner

*Primary Examiner*—Jason C Olson
(74) *Attorney, Agent, or Firm*—Nixon & Vanderhye P.C.

(57) ABSTRACT

A method of testing a performance of a HGA including a magnetic head and a micro-actuator for precisely positioning the magnetic head with respect to a magnetic medium is disclosed. The key of the method is to obtain three track center values under conditions of no driving the micro-actuator, driving the micro-actuator in a positive direction using an operating DC voltage, and driving the micro-actuator in a negative direction using the operating DC voltage respectively, and finally do calculation of the three track center values, thus successfully obtains the displacement performance of the micro-actuator in a simple way. The method is capable of testing the HGA's performance under lower operating voltage by moving the slider by a predetermined distance toward an off-track direction, which accordingly assists to identify three track center values and thereby ensures the method an accurate measurement.

4 Claims, 10 Drawing Sheets

FIG. 7 ly coupled the PZT micro-actuator 205 to corresponding sus-
PERFORMANCE TEST METHOD OF HEAD GIMBAL ASSEMBLY WITH PRECISE POSITIONING MICRO-ACTUATOR

FIELD OF THE INVENTION

The present invention relates to a method for testing a performance of a head gimbal assembly (HGA) with a precise positioning micro-actuator for a slider used in a magnetic disk drive device, particularly to a method for testing a displacement performance of the micro-actuator.

BACKGROUND OF THE INVENTION

One known type of information storage device is a disk drive device that uses magnetic media to store data and a movable read/write head that is positioned over the media to selectively read from or write to the media.

Consumers are constantly desiring greater storage capacity for such disk drive devices, as well as faster and more accurate reading and writing operations. Thus, disk drive manufacturers have continued to develop higher capacity disk drives by, for example, increasing the recording and reproducing density of the information tracks on the disks by using a narrower track width and/or a narrower track pitch. However, each increase in track density requires that the disk drive device have a corresponding increase in the positional control of the read/write head in order to enable quick and accurate reading and writing operations using the higher density disks. As track density increases, it becomes more and more difficult to quickly and accurately position the read/write head over the desired information tracks on the disk. Thus, disk drive manufacturers are constantly seeking ways to improve the positional control of the read/write head in order to take advantage of the continual increases in track density.

Figure 1:
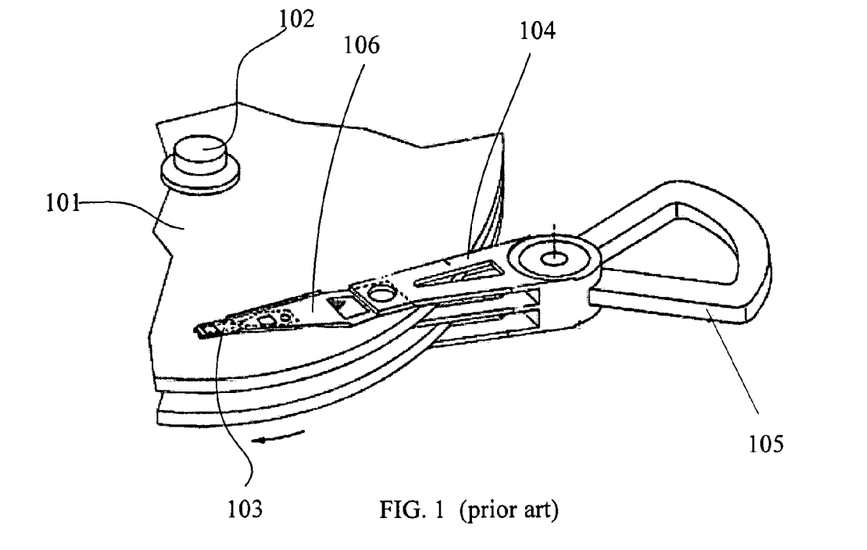
FIG. 1 shows a typical hard disk drive (HDD) structure with a VCM for positional control of a read/write head according to a prior art.

One approach that has been effectively used by disk drive manufacturers to improve the positional control of read/write heads for higher density disks is to employ a voice coil motor (VCM). Referring to FIG. 1, a conventional disk drive device using VCM typically has a drive arm 104, a head gimbal assembly (HGA) 106 attached to and mounted on the drive arm 104, a stack of magnetic disks 101 suspending the HGA 106, and a spindle motor 102 for spinning the disks 101. The employed VCM is denoted by reference number 105 and is connected to the drive arm 104 for controlling the motion of the drive arm 104 and, in turn, controlling a slider 103 of the HGA 106 to position with reference to data tracks across the surface of the magnetic disk 101, thereby enabling the read/write head imbedded in the slider 103 to read data from or write data to the disk 101. Thus, the VCM 105 well performs adjustments to the position of the read/write head. However, as VCM 105 possesses limited bandwidth due to its large inertia, the position control of the read/write head with respect to the track by the VCM 105 has never presented enough accuracy, and thereby the slider 103 can not attain a quick and fine position control which accordingly affects the ability of the read/write head to read data from and write data to the disk 101.

Figure 2A:
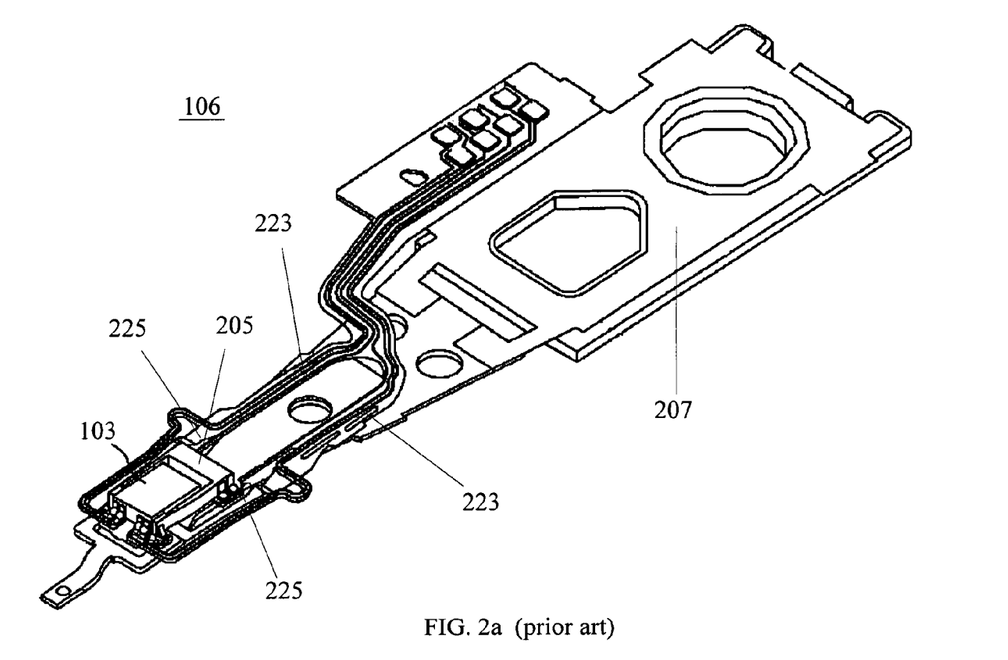
FIG. 2a shows a typical HGA of the HDD of FIG. 1 in detail with a PZT micro-actuator for precise positional control of the read/write head.
Figure 2B:
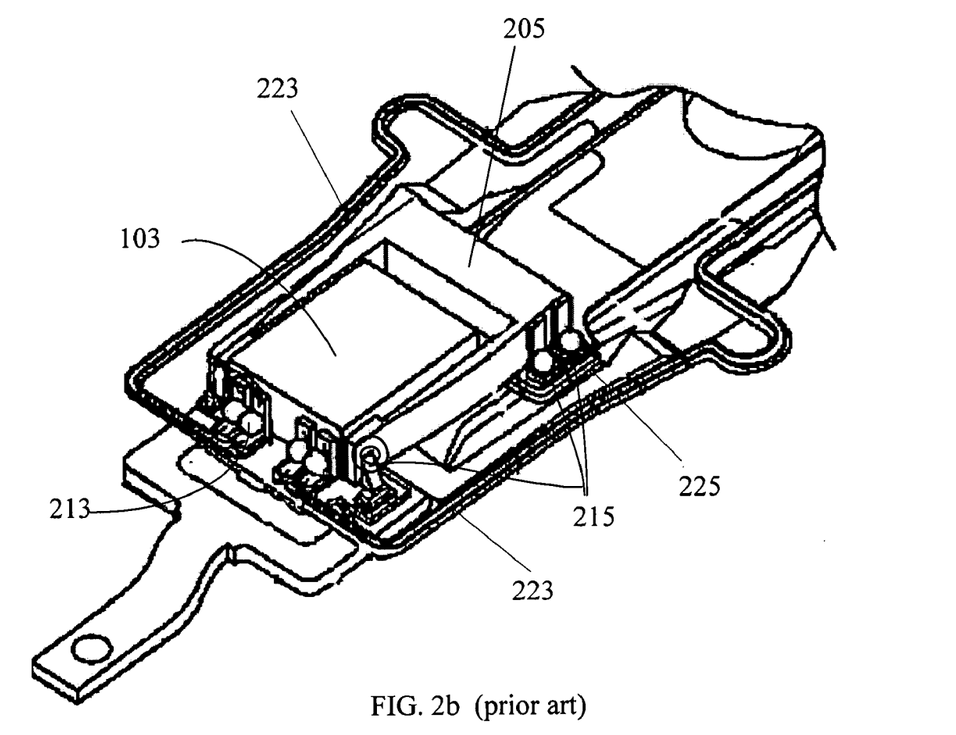
FIG. 2b shows a detail structure of the HGA of FIG. 2a, especially showing the arrangement of the PZT micro-actuator relative to a slider and a suspension of the HGA.

In order to solve the problem, an additional actuator mechanism, for example a PZT micro-actuator, is introduced in the disk drive device in order to modify the displacement of the slider, thus the disk drive device forms a dual stage actuator (DSA). Referring to FIGS. 2a and 2b, the disk drive device employs a PZT micro-actuator 205 as the additional actuator and the PZT micro-actuator 205 is mounted within the HGA 106 of the disk drive device. Specifically, the HGA 106 has a suspension 207 to suspend the slider 103 thereon. The PZT micro-actuator 205 is mounted on a tongue of the suspension 207 and partially incorporates the slider 103. Multiple electrical connection balls 215 (gold ball bonding or solder ball bonding, GBB or SBB) are electrically coupled the PZT micro-actuator 205 to corresponding suspension traces 225 while multiple electrical connection balls 213 are electrically coupled the PZT micro-actuator 205 to corresponding suspension traces 223. The suspension traces 223, 225 are electrically coupled with a control system (not shown) which controls the slider 103 as well as the PZT micro-actuator 205.

Figure 2C:
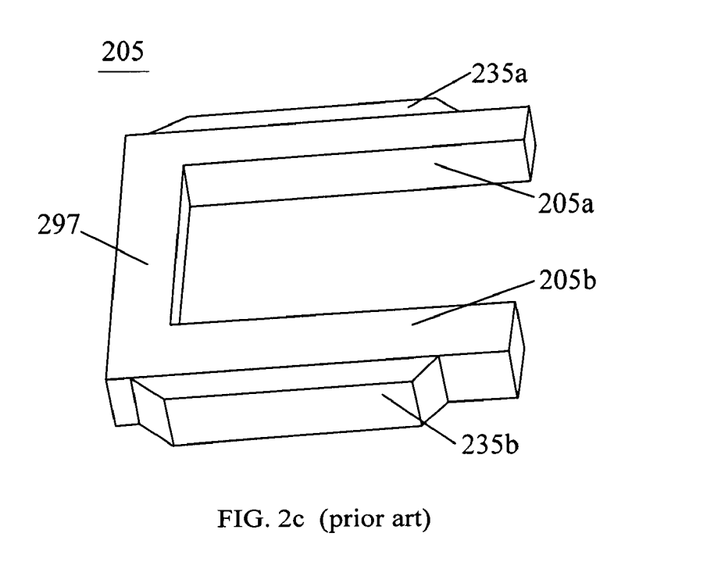
FIG. 2c is a perspective view of the PZT micro-actuator shown in FIG. 2b.
Figure 2D:
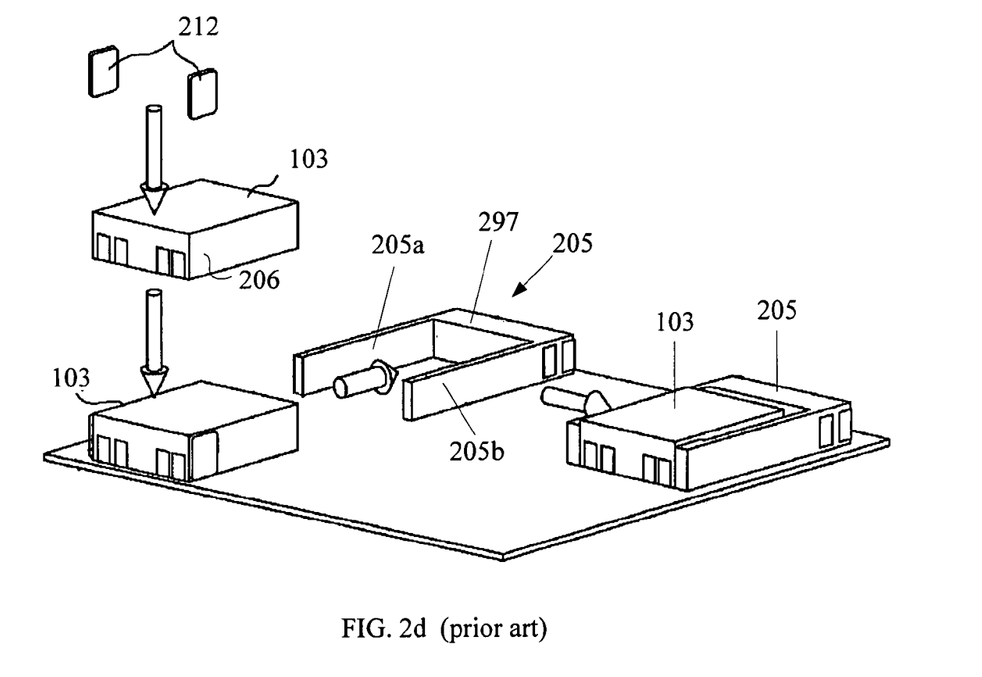
FIG. 2d shows a detailed process of mounting the slider to the PZT micro-actuator of FIG. 2b.
Figure 2E:
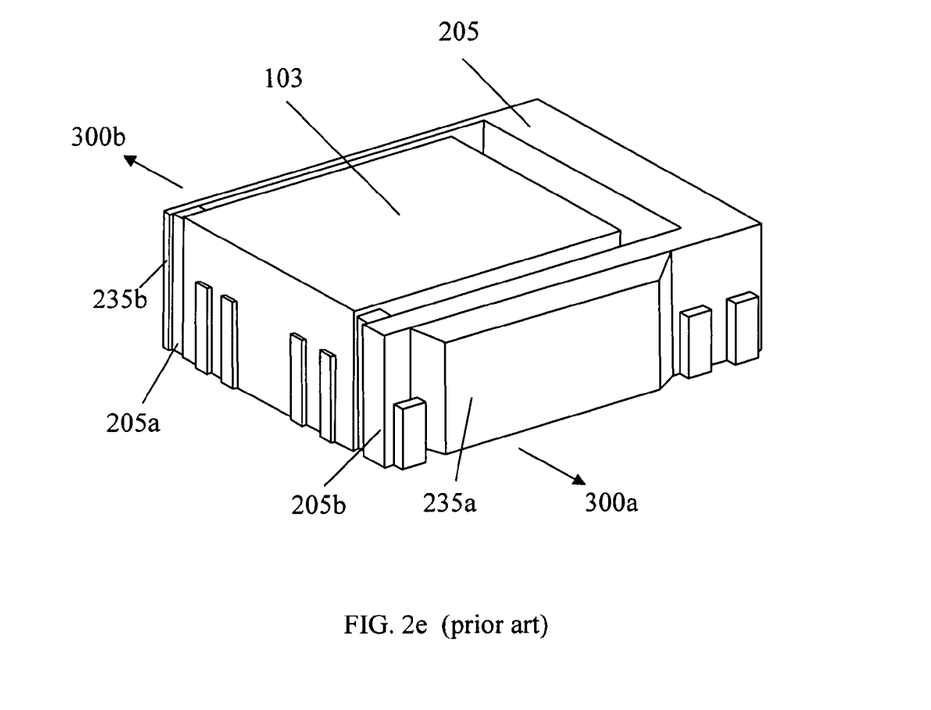
FIG. 2e schematically shows the positional control principle of the PZT micro-actuator.

Referring to FIGS. 2c and 2d, the PZT micro-actuator 205 comprises a U-shaped frame 297 which comprises two side beams 205a, 205b. The side beam 205a has a PZT element 235a and the side beam 205b has a PZT element 235b. The slider 103 is mechanically connected with the two side beams 205a, 205b of the PZT micro-actuator 205 by epoxy 212 at bonding points 206 of the slider 103. The bottom of the U-shape frame 297 is attached to the tongue of the suspension 207. The slider 103 and the frame 297 mutually form a rectangular hollow structure. The slider 103 and the side beams 205a, 205b are not directly connected to the tongue of the suspension 207 and thus enable the slider 103 and the side beams 205a, 205b to move freely with respect to the tongue of the suspension 207. Referring to FIG. 2e, when an actuating power is applied through the suspension traces 225 to the PZT micro-actuator 205, the PZT elements 235a, 235b will expand or contract, causing the beams 205a, 205b to bend in a common lateral direction. That is, when the sine voltage is input to the PZT element 235a and 235b, in the first half period, the side arm 205a will bend toward outer side 300a, while, in the second half period, the side arm 205b will bend toward outer side 300b. Thus the initial rectangular hollow structure becomes approximately a parallelogram, leading the slider 103 to undergo a lateral translation, through which successfully adjusts the slider's position. Therefore, the PZT micro-actuator 205 enables a smaller recording track width and a higher 'tracks per inch' (TPI) value, and thus creates a possibility of improving surface recording density.

Figure 3A:
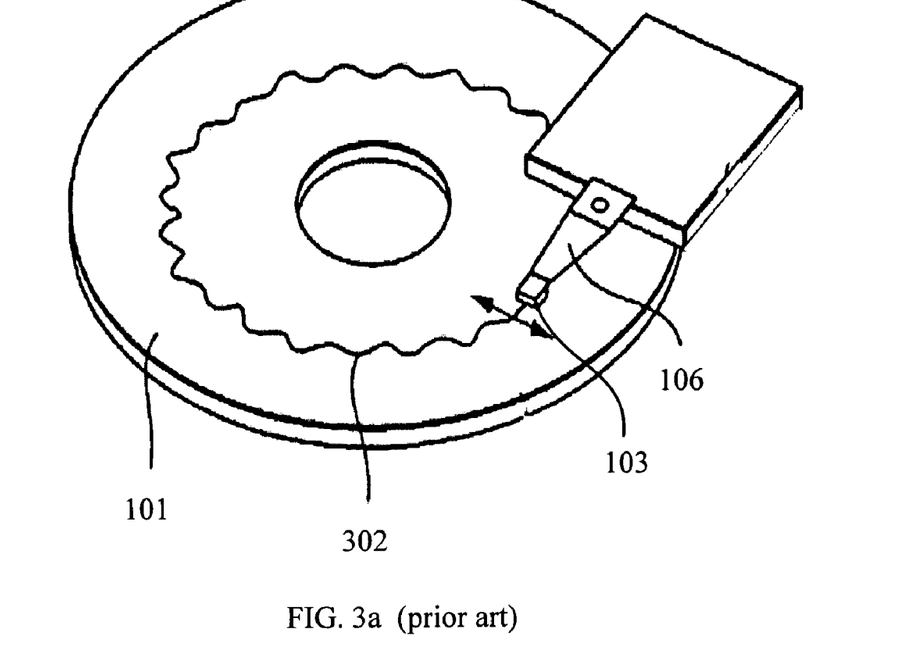
FIG. 3a is a view illustrating writing operations to a magnetic disk with driving the PZT micro-actuator by an alternating voltage using traditional AC test method.
Figure 3B:
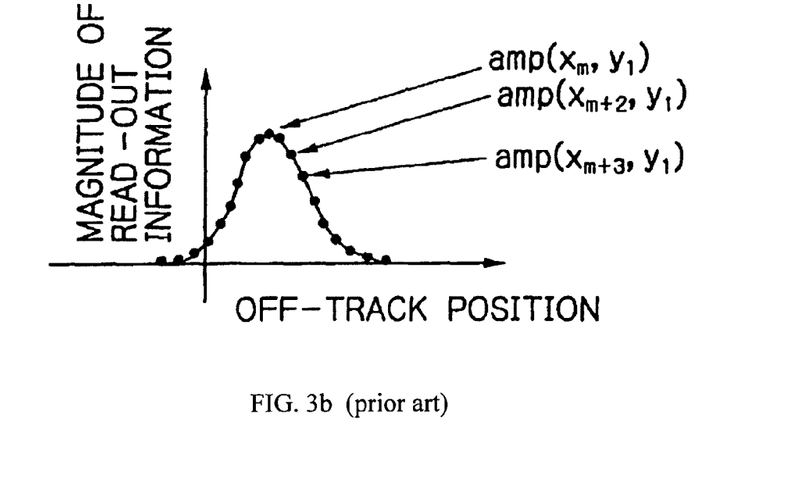
FIG. 3b is a view illustrating an off-track position where magnitude of read-out information or output amplitude is maximum at one position along the disk-rotating direction or track direction.
Figure 3C:
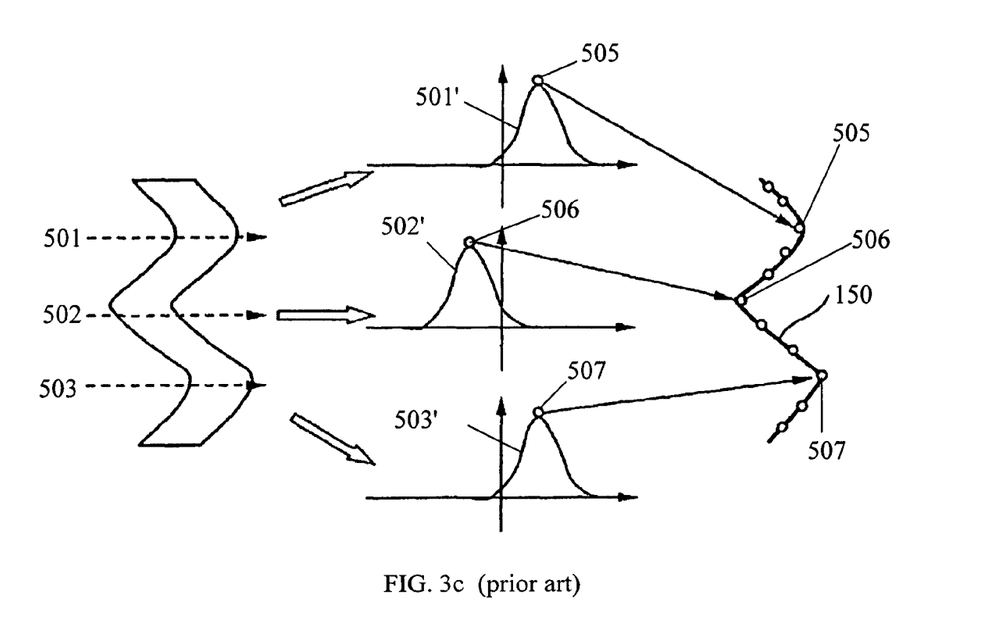
FIG. 3c is a view schematically showing the AC-test method of FIG. 3a and detailedly illustrating the reason why a center line of the track written to the disk can be obtained by plotting off-track positions where the magnitude of read-out information or outputs are maximum and connecting plotted positions.

In order to test a displacement performance of the DSA such as the displacement to identify whether the DSA has the adjustment capability, a prior art provides an AC (Alternative Current) testing method which uses the magnetic head to read and write information on the disk by a R/W tester. Referring to FIG. 3a, when writing operation is executed while the actuator is driven by sine voltage, a non-circular track 302 will be recorded on the disk 101. The R/W tester can do scanning of read-out information along the disk-rotating direction in the track of the disk 101 at each of off-track directions. The read-out information or output amp($x_m$, $y_n$) is two-dimensional, wherein $x_m$ denotes a certain off-track position and $y_n$ denotes a certain disk-rotating position. Referring to FIG. 3b, at a given disk-rotating position $y_1$, the read-out information amp($x_m$, $y_1$) at the off-track position $x_m$ is the maximum. FIG. 3c shows three response curves 501', 502', 503' respectively indicating output amplitude at given disk-rotating positions 501, 502, 503. By plotting these off-track positions where the read-out information become maximum at the disk-rotating positions $y_1$, $y_2$, $y_3$ ... $y_n$ and by connecting these plotted points, a displacement curve 150 on the magnetic disk can be obtained which indicates a center line of the magnetic information. As seen from FIG. 3c, the curve 150 is a plot of maximum output amplitude at point 505, 506, 507 of the three response curves 501', 502', 503', The displacement curve 150 corresponds to displacement of the actuator during write operation. Thus, a response performance of the actuator in response to the applied alternating voltage is determined.

Figure 3D:
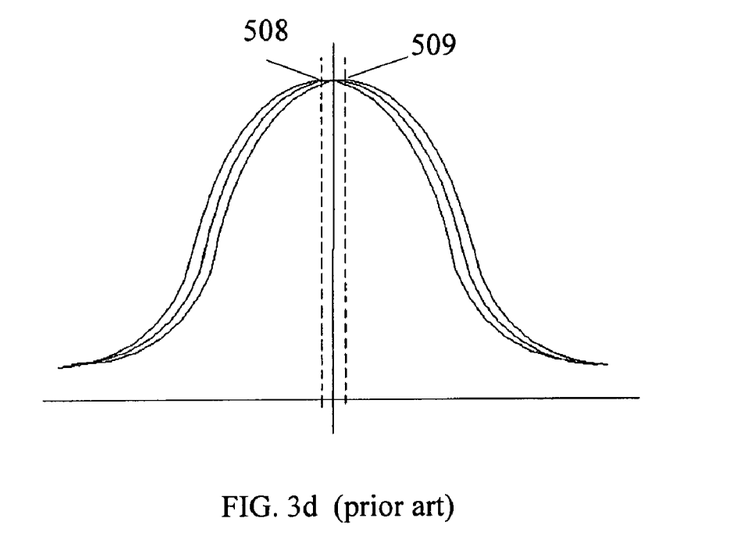

However, the test method arises various problems. According to FIG. 3b, if the amplitude of the alternating voltage is small, for example less than 5 v, it is really difficult to define the points 505, 506, 507 and thus the displacement value is difficult to judge. So the test method has measurement accuracy issue. Furthermore, referring to FIG. 3d, when the amplitude of the alternating voltage is small, it is extremely tough to seek out maximum amplitude positions 508, 509 thus hampering plotting displacement curve, thus unable to test the displacement performance of the DSA, which is another negative factor of the prior method. That is, the method has a limitation on the displacement measurement especially in a lower operation voltage. Thirdly, because of requiring the R/W tester testing two-dimensional read-out information, the prior method is complex, which unavoidably and unfavorably makes the testing time long and accordingly causes the test cost extremely high.

Hence, a need has arisen for providing an improved performance test method of an HGA to overcome the above-mentioned problems.

SUMMARY OF THE INVENTION

Accordingly, an object of the present invention is to provide a method of testing a performance of a HGA capable of accurately testing a displacement performance of a micro-actuator of the HGA under lower operation voltage with simple process and short time.

To achieve the above-mentioned object, the present invention provides a method for testing a performance of a HGA including a slider with a magnetic head and a micro-actuator for precisely positioning the magnetic head with respect to a magnetic medium. The method comprises the steps of: (1) writing an initial track of information onto the magnetic medium, reading out the initial track of information, measuring an initial track average amplitude (TAA) profile of the read-out initial track of information, and calculating a track center value OFFSET 1 according to the initial TAA profile; (2) judging whether an operating direct current (DC) voltage to be applied to the micro-actuator is higher than a threshold value or not, if NO, performing steps (3)-(6), if YES, going to step (7); (3) moving the magnetic head toward an off-track direction by a predetermined distance D; (4) applying the operating DC voltage to the micro-actuator to drive the micro-actuator displacement in a positive direction and simultaneously writing a first track of information onto the magnetic medium, reading out the first track of information, measuring a first TAA profile of the read-out first track of information, and calculating a track center value OFFSET 2 according to the first TAA profile; (5) applying the operating DC voltage to the micro-actuator to drive the micro-actuator displacement in a negative direction and simultaneously writing a second track of information onto the magnetic medium, reading out the second track of information, measuring a second TAA profile of the read-out second track of information, and calculating a track center value OFFSET 3 according to the second TAA profile; (6) calculating the displacement of the micro-actuator according to a formula, the formula being ((OFFSET 2−OFFSET 1−D)+(D−(OFFSET 3−OFFSET 1)))/2; (7) applying the operating DC voltage to the micro-actuator to drive the micro-actuator displacement in a positive direction and simultaneously writing a first track of information onto the magnetic medium, reading out the first track of information, measuring a first TAA profile of the read-out first track of information, and calculating a track center value OFFSET 2' according to the first TAA profile; (8) applying the operating DC voltage to the micro-actuator to drive the micro-actuator displacement in a negative direction and simultaneously writing a second track of information onto the magnetic medium, reading out the second track of information, measuring a second TAA profile of the read-out second track of information, and calculating a track center value OFFSET 3' according to the second TAA profile; and (9) calculating the displacement of the micro-actuator according to a formula, the formula being (OFFSET 2'+OFFSET 3')/2.

Preferably, the threshold value is equal to 5 volts.

Alternatively, the TAA profiles are measured by a Dynamic Performance (DP) tester or a read/write (R/W) tester.

As an embodiment of the present invention, the predetermined distance D is set to be inversely proportional to the value of the operating DC voltage.

In comparison with the prior method, besides capable of obtaining displacement performance of the micro-actuator of the HGA in case of a high operating voltage, the present invention can also test the displacement of the micro-actuator when a low operating voltage is applied to the micro-actuator by moving the magnetic head by a predetermined distance D toward the off-track direction. For this reason, the present method can easily and distinctively seek out the respective track center values and thus provide an accurate measurement. Besides, regardless of the magnitude of the operating voltage, the present method of displacement performance measurement only needs to calculate three data, that is, the track center values OFFSET 1, OFFSET 2 and OFFSET 3 under low operating voltage, or track center values OFFSET 1, OFFSET 2' and OFFSET 3' under high operating voltage. Hence the process of the present method is much simpler. Furthermore, as the present method can easily seek out the respective track center values, the leading time for the seeking operation is somewhat reduced, thereby the testing time of the method is significantly shortened especially when the simple three-data calculation process is taken into account as well.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 3d shows a detail explanation of the difficulty in defining the displacement in the AC-test method of FIG. 3a;

DETAILED DESCRIPTION OF ILLUSTRATED EMBODIMENTS

Various preferred embodiments of the invention will now be described with reference to the figures, wherein like reference numerals designate similar parts throughout the various views. As indicated above, the invention is directed to a method of testing a performance of a HGA including a magnetic head and a micro-actuator for precisely positioning the magnetic head with respect to a magnetic medium. The key of the present method is to obtain three track center values under conditions of no driving the micro-actuator, driving the micro-actuator in a positive direction using an operating DC voltage, and driving the micro-actuator in a negative direction using the operating DC voltage respectively, and finally do calculation of the three track center values, thus successfully obtains the displacement performance of the micro-actuator in a simple way. Moreover, the present method is capable of testing the HGA's performance under lower operating voltage by moving the magnetic head by a predetermined distance toward an off-track direction, which accordingly assists to identify three track center values and thereby ensures the present method an accurate measurement. In addition, the present method can reduce the testing time as a result of the simple process.

Figure 4:
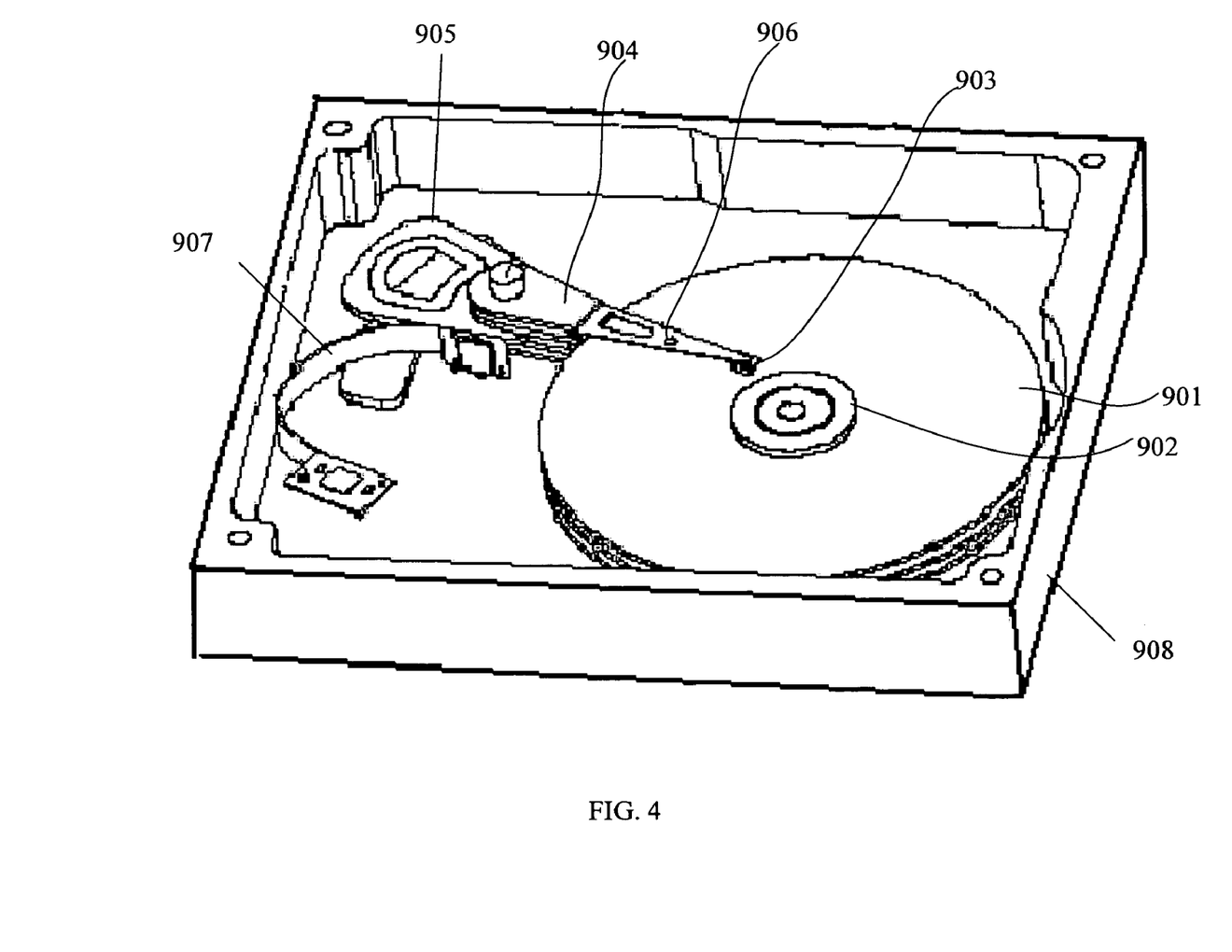
FIG. 4 illustrates the entire structure of a HDD having a HGA used for HGA performance test according to the present invention.

FIG. 4 illustrates the entire structure of a HDD having the HGA used for HGA performance test according to the present invention. The HDD comprises the HGA 906 including a slider 903, a drive arm 904 connected to the HGA 906, a VCM 905 controlling the drive arm 904, a disk 901, and a spindle motor 902 to spin the disk 901, all of which are mounted in a housing 908. A flex cable 907 electrically connects the HGA 906 to a printed circuit board assembly (PCBA, not shown). The VCM 905 is provided for controlling the motion of the motor arm 904 so as to displace the whole HGA, and in turn, roughly controlling the slider 903 to move from track to track across the top surface of the disk 901. In addition, the HGA also employs a micro-actuator (shown in FIG. 5) for precisely positioning the slider 903 to tracks of the top surface of the disk 901. The micro-actuator could expand and/or contract by reverse piezoelectric effect, thus generating the displacement of the slider 903. The displacement of the slider 903 results the swing of the magnetic head along an arc so as to cross recording tracks of the disk 901.

Figure 5A:
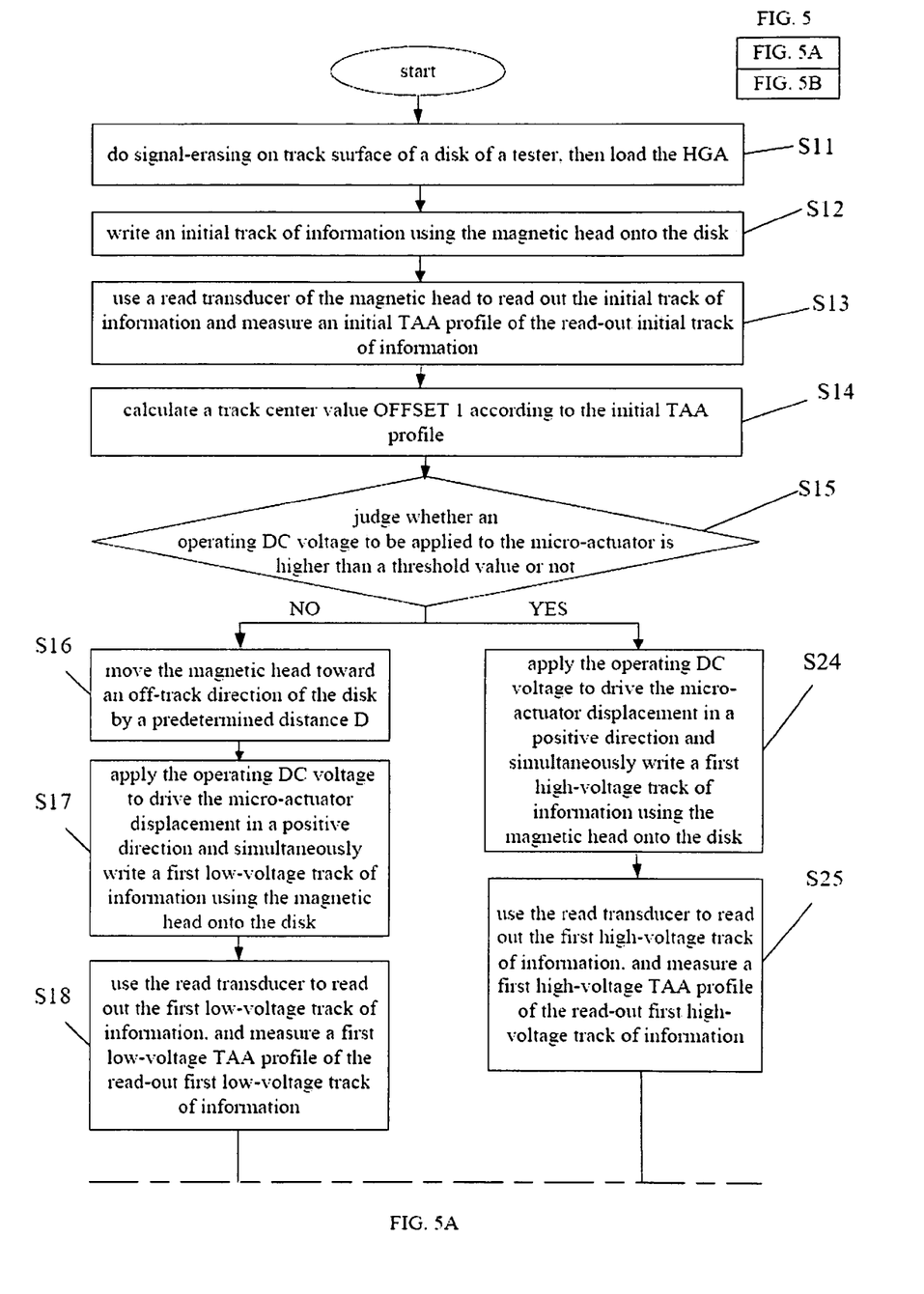
FIG. 5 is a flow chart illustrating a process of the HGA performance test method of an embodiment for testing the HGA shown in FIG. 4 according to the present invention.
Figure 5B:
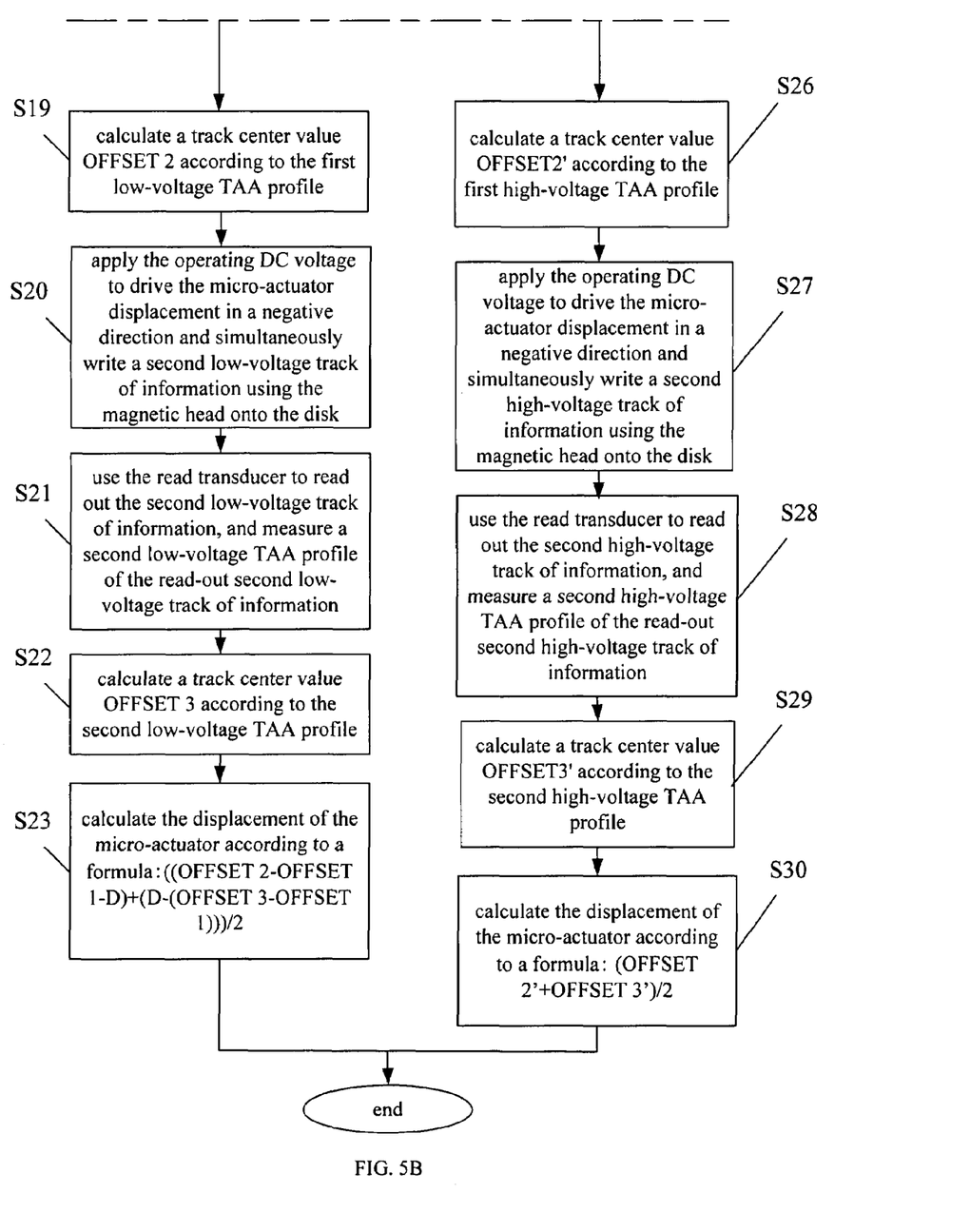
Figure 6A:
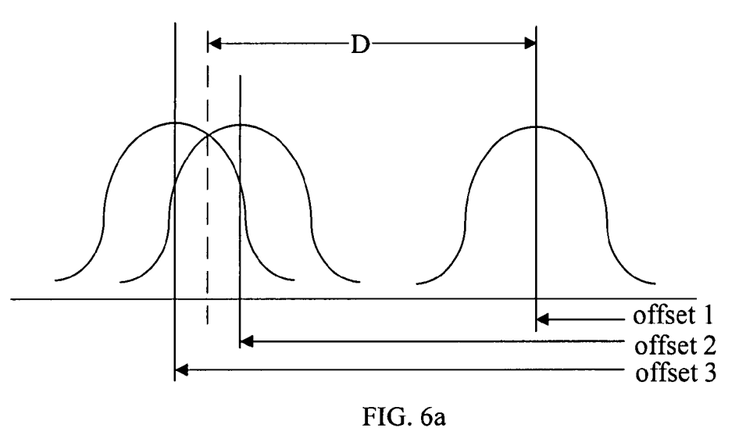
FIG. 6a illustrates a low-voltage initial TAA profile, a first low-voltage TAA profile, a second low-voltage TAA profile obtained by a track profile measurement in the embodiment shown in FIG. 6.
Figure 6B:
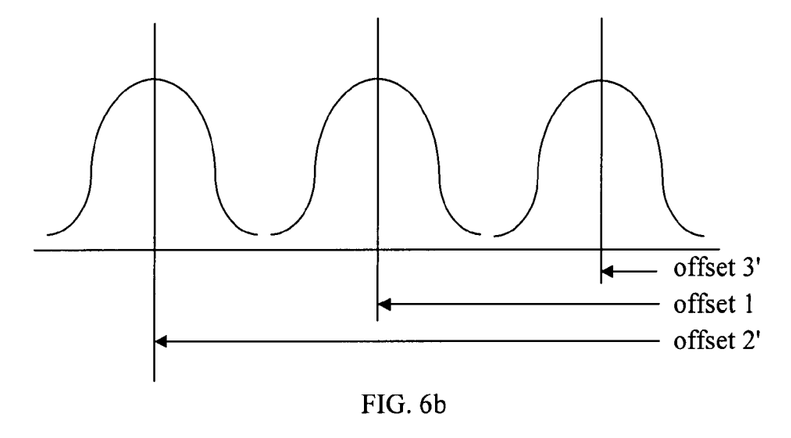
FIG. 6b illustrates a high-voltage initial TAA profile, a first high-voltage TAA profile, a second high-voltage TAA profile obtained by the track profile measurement in the embodiment shown in FIG. 6.

FIG. 5 is a flow chart illustrating a process of the HGA performance test method of an embodiment for testing the HGA shown in FIG. 4 according to the present invention. Hereinafter, the displacement performance test method of FIG. 6 will be described in detail.

First, do signal-erasing on track surface of a disk of a tester, then load the HGA (shown in FIG. 4) to be tested on the disk (step S11). It is understood that the HGA is loaded so that the air bearing surface (ABS) of a magnetic head embedded in the slider of the HGA faces to the top surface of the disk.

Thereafter, write an initial track of information using the magnetic head onto the disk (step S12). In this case, the magnetic head writes without driving the micro-actuator of the HGA for displacement. Then, use a read transducer of the magnetic head to read out the initial track of information and measure an initial TAA profile of the read-out initial track of information (step S13). And then, calculate a track center value OFFSET 1 according to the initial TAA profile (step S14). The initial TAA profile and the track center value OFFSET 1 are respectively shown in FIG. 6a and FIG. 6b.

Next, judge whether an operating DC voltage to be applied to the micro-actuator is higher than a threshold value or not (step S15). If NO, namely the operating DC voltage is not higher than the threshold value, the process goes to step S16. Preferably, the threshold value is equal to 5 volts.

In step S16, move the magnetic head toward an off-track direction of the disk by a predetermined distance D. In the embodiment, the predetermined distance D is set to be inversely proportional to the value of the operating DC voltage.

Thereafter, apply the operating DC voltage to drive the micro-actuator displacement in a positive direction and simultaneously write a first low-voltage track of information using the magnetic head onto the disk (step S17). Then use the read transducer to read out the first low-voltage track of information, and measure a first low-voltage TAA profile of the read-out first low-voltage track of information (step S18). And then calculate a track center value OFFSET 2 according to the first low-voltage TAA profile (step S19). The first low-voltage TAA profile and the track center value OFFSET 2 are both shown in FIG. 6a.

Next, apply the operating DC voltage to drive the micro-actuator displacement in a negative direction and simultaneously write a second low-voltage track of information using the magnetic head onto the disk (step S20). Then use the read transducer to read out the second low-voltage track of information, and measure a second low-voltage TAA profile of the read-out second low-voltage track of information (step S21). And then calculate a track center value OFFSET 3 according to the second low-voltage TAA profile (step S22). The second low-voltage TAA profile and the track center value OFFSET 3 are both shown in FIG. 6a.

Thereafter, calculate the displacement of the micro-actuator according to a formula that is ((OFFSET 2-OFFSET 1−D)+(D−(OFFSET 3-OFFSET 1)))/2 (step S23). Thus the process successfully gets the displacement performance of the micro-actuator of the HGA under low operating voltage.

As stated above, if the judgement of the step S15 indicates that the operating DC voltage is higher than the threshold value, the process will go to step S24.

In step S24, apply the operating DC voltage to drive the micro-actuator displacement in a positive direction and simultaneously write a first high-voltage track of information using the magnetic head onto the disk. Then use the read transducer to read out the first high-voltage track of information, and measure a first high-voltage TAA profile of the read-out first high-voltage track of information (step S25). And then calculate a track center value OFFSET 2' according to the first high-voltage TAA profile (step S26). The first high-voltage TAA profile and the track center value OFFSET 2' are both shown in FIG. 6b.

Next, apply the operating DC voltage to drive the micro-actuator displacement in a negative direction and simultaneously write a second high-voltage track of information using the magnetic head onto the disk (step S27). Then use the read transducer to read out the second high-voltage track of information, and measure a second high-voltage TAA profile of the read-out second high-voltage track of information (step S28). And then calculate a track center value OFFSET 3' according to the second high-voltage TAA profile (step S29. The second high-voltage TAA profile and the track center value OFFSET 3' are both shown in FIG. 6b.

Thereafter, calculate the displacement of the micro-actuator according to a formula that is (OFFSET 2'+OFFSET 3')/2 (step S30). Thus the process successfully gets the displacement performance of PZT micro-actuator of the HGA under high operating voltage.

Preferably, the TAA profiles are measured by a spindle tester. Specifically, the spindle tester may be a R/W tester or a DP tester, both of which have a track profile measurement function. By gradually shifting the HGA location on the spindle tester along an off-track direction of the disk, the spindle tester measures TAA profiles at different positions in the off-track direction.

Figure 7:
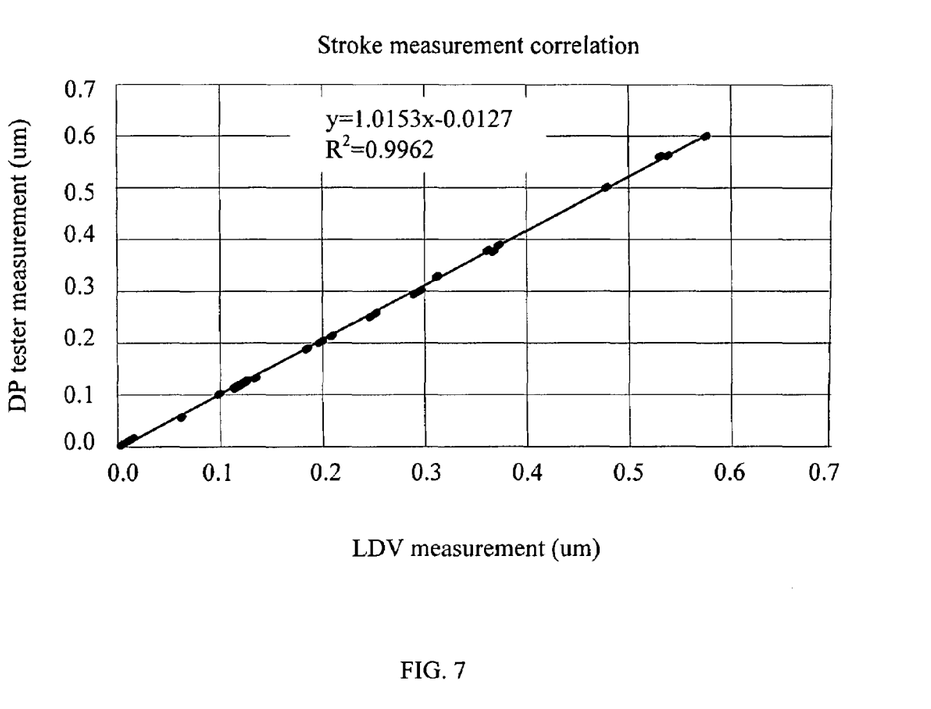
FIG. 7 is a graph illustrating correlations between DC stroke measured by using a DP tester of the embodiment of FIG. 6 and DC stroke measured by using a traditional laser Doppler vibration measurement.

FIG. 7 is a graph illustrating correlations between DC stroke measured by using a DP tester of the embodiment of FIG. 6 and DC stroke measured by using a traditional laser Doppler vibration (LDV) measurement. As the FIG. 8 illustrated, the correlation is linear which indicates a very good correlation between the DP tester measurement and the LDV measurement, thus it is understandable that correct response displacement of the HGA with micro-actuator can be measured by the method of this embodiment.

Thus, the present invention provides, in various embodiments, a method of testing a performance of a HGA. The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, and to enable others skilled in the art to best utilize the invention and various embodiments with various modifications as are suited to the particular use contemplated. It is intended that the scope of the invention be defined by the claims appended hereto and their equivalents.

What is claimed is:

1. A method for testing a performance of a head gimbal assembly including a magnetic head and a micro-actuator for precisely positioning the magnetic head with respect to a magnetic medium, the method comprising steps of:

(1) writing an initial track of information onto the magnetic medium, reading out the initial track of information, measuring an initial track average amplitude profile of the read-out initial track information, and calculating a track center value OFFSET 1 according to the initial track average amplitude profile;

(2) judging whether an operating direct current voltage to be applied to the micro-actuator is higher than a threshold value or not, if NO, performing steps (3)-(6), if YES, performing steps (7)-(9);

(3) moving the magnetic head toward an off-track direction by a predetermined distance D;

(4) applying the operating direct current voltage to the micro-actuator to drive the micro-actuator displacement in a positive direction and simultaneously writing a first track of information onto the magnetic medium, reading out the first track of information, measuring a first track average amplitude profile of the read-out first track of information, and calculating a track center value OFFSET 2 according to the first track average amplitude profile;

(5) applying the operating direct current voltage to the micro-actuator to drive the micro-actuator displacement in a negative direction and simultaneously writing a second track of information onto the magnetic medium, reading out the second track of information, measuring a second track average amplitude profile of the read-out second track of information, and calculating a track center value OFFSET 3 according to the second track average amplitude profile;

(6) calculating the displacement of the micro-actuator according to a formula, the formula being ((OFFSET 2−OFFSET 1−D)+(D−(OFFSET 3−OFFSET 1)))/2;

(7) applying the operating direct current voltage to the micro-actuator to drive the micro-actuator displacement in a positive direction and simultaneously writing a first track of information onto the magnetic medium, reading out the first track of information, measuring a first track average amplitude profile of the read-out first track of information, and calculating a track center value OFFSET 2' according to the first track average amplitude profile;

(8) applying the operating direct current voltage to the micro-actuator to drive the micro-actuator displacement in a negative direction and simultaneously writing a second track of information onto the magnetic medium, reading out the second track of information, measuring a second track average amplitude profile of the read-out second track of information, and calculating a track center value OFFSET 3' according to the second track average amplitude profile; and (9) calculating the displacement of the micro-actuator according to a formula, the formula being (OFFSET 2'+OFFSET 3')/2.

2. The method according to claim 1, wherein the threshold value is equal to 5 volts.

3. The method according to claim 1, wherein the track average amplitude profiles are measured by a Dynamic Performance tester or a read/write tester.

4. The method according to claim 1, wherein the predetermined distance D is set to be inversely proportional to the value of the operating direct current voltage.

* * * * *